United States Patent Office 3,370,034
Patented Feb. 20, 1968

3,370,034
POLYMER COMPOSITIONS CONTAINING BENZO-
THIOXOLE STABILIZING MATERIALS
Silvio L. Giolito, Whitestone, N.Y., assignor to Stauffer
Chemical Company, New York, N.Y., a corporation of
Delaware
No Drawing. Filed Nov. 25, 1966, Ser. No. 596,743
10 Claims. (Cl. 260—45.8)

ABSTRACT OF THE DISCLOSURE

The present invention is directed to polyolefin polymer compositions containing a stabilizing quantity of hydroxy substituted 2-keto or 2-imino benzothioxole materials as stabilizer therefor. The preferred stabilizing compounds are 4-hydroxy-2-keto benzothioxole and 4-hydroxy-2-imino benzothioxole used in an amount of from above 0.01% to about 5.0% by weight based on the weight of the polymer.

Specification

The present invention relates to stabilization of alpha-olefin polymer compositions from degradation due to oxidation influenced by ultraviolet light by the inclusion in the composition of a benzothioxole stabilizing material.

Alpha-olefin polymeric materials, such as polyethylene and polypropylene have attained considerable commercial importance due to their excellent physical, mechanical and electrical properties. However, these materials are subject to deterioration from heat and sunlight, both of which induce degradation of the polymeric chain structure and thereby impair tensile strength, low temperature, brittleness and dielectric properties.

It has been discovered that a certain class of benzothioxole compounds are surprisingly effective in preventing the oxidative degradation of olefin polymeric materials induced by ultraviolet radiation.

In accordance with the present invention, polymer compositions of olefin polymeric materials are stabilized against oxidative degradation by inclusion in the polymer composition of a stabilizer of the formula:

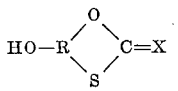

wherein R is an aromatic nucleus, such as benzene or naphthalene, attached to the heterocyclic ring in the 1, 2 position, and X stands for an imino group or oxygen. These compounds when utilized in relatively small amounts are extremely effective in reducing ultraviolet radiation degradation of olefin polymeric material compositions.

The preferred stabilizing materials of the present invention are benzothioxole compounds of the formulas:

(A)

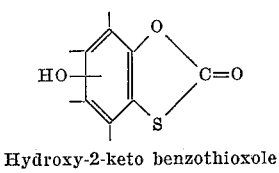

Hydroxy-2-keto benzothioxole (B)

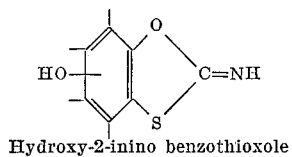

Hydroxy-2-imino benzothioxole

It is preferred that the hydroxy substituent on the aromatic ring be ortho to the thioxole heterocyclic ring system. The remainder of the aromatic nucleus can be hydrogen or substituted with alkyl substituents, illustrated by methyl and the like; substituted alkyl, illustrated by benzyl, phenethyl and the like; hydroxy; halogen; and the like with substantially equal effectiveness. Preferably, the aromatic nucleus is an unsubstituted benzene ring in that substituents tends to slightly retard the stabilization characteristics of the compound.

Illustrative of these compounds are the following:

4-hydroxy-2-keto benzothioxole
7-hydroxy-2-keto benzothioxole
4-hydroxy-3-imino benzothioxole
7-hydroxy-2-imino benzothioxole
4-hydroxy-2-imino-5-chloro benzothioxole
4-hydroxy-2-keto-5-chloro benzothioxole
2-keto-4,6 dihydroxy benzothioxole
2-keto-4 hydroxy-6-methyl benzothioxole
4-hydroxy-2-imino-naphtho[2,1][1,3]thioxole
4-hydroxy-2-keto-naphtho[2,1][1,3]thioxole
8-hydroxy-2-keto-naphtho[2,1][1,3]thioxole
8-hydroxy-2-imino-naphtho[2,1][1,3]thioxole
8-hydroxy-2-keto-naphtho[1,2][1,3]thioxole
8-hydroxy-2-imino-naphtho[1,2][1,3]thioxole
4-hydroxy-5-benzyl-2-keto benzothioxole The hydroxy-benzothioxole stabilizers are easily prepared by conventional methods. A most convenient method is by the reaction of polyhydroxy benzenes with cupric thiocyanate to form the thioxole derivatives. This is a well known method and is set forth in U.S. Patents 2,276,553 and 2,332,418.

The thioxole stabilizer compounds as described herein are suitable for stabilizing a wide variety of solid poly-α-olefin hydrocarbon polymer compositions against deterioration resulting from exposure to actinic radiation. These polymers are any of the normally solid homopolymers and copolymers derived from the polymerization of α-monoolefinic aliphatic hydrocarbons containing from two to ten carbon atoms but more particularly those containing a predominant amount of polymerized olefin monomers containing 2–3 carbon atoms. Typical poly-α-olefin homopolymers include polyethylene, polypropylene, poly(3-methylbutene-1), poly(4-methylpentene-1), poly(pentene-1), poly(3,3-dimethylbutene-1), poly(4,4-dimethylbutene-1), poly(octene-1), poly(decene-1), and the like. Within the term polymer is also included copolymers and interpolymers such as, terpolymers, derived from the α-monoolefinic hydrocarbons containing from two to ten carbon atoms forming the illustrated polymers in combination with other α-monoolefinic and/or diolefinic and cyclodiolefinic hydrocarbon materials. The diolefinic materials are illustrated by butadiene and the like, and the cyclodiolefinic materials by cyclopentadiene and the like. Illustrative of the copolymers and terpolymers are ethylene-propylene copolymers, ethylene-propylene-butene-1, terpolymers, ethylene-propylene-butadiene terpolymers, ethylene-propylene-hexene terpolymers, and the like. The terms hydrocarbon polymer hydrocarbon polymeric material and olefin or olefinic hydrocarbon material are used in the strict sense to denote material containing only carbon and hydrogen atoms.

It has been ascertained that the thioxole stabilizer compounds of the invention are particularly useful for preventing photo-degradation by ultra-violet light or sunlight of the highly crystalline polyolefins such as isotactic polypropylene. Isotactic, polypropylene is a stereo-regular polymer wherein the monomeric units are linked predominantly end-to-end rather than the more common arrangement consisting of a distribution of linear and crosslinked units. Moreover, the substituents attached to the chain are systematically disposed in a configuration which tends to promote an orderly and close alignment of the molecules. Such stereo-regular polymers exhibit a high degree of crystallinity and are much superior in physical properties to amorphous polymers having a random distribution of monomeric units. For a fuller description of crystalline polymers, reference is made to the Scientific American, 197 No. 3, pages 98–104 (1957); 205 No. 2, pages 33–41 (1961).

Although the molecular weight of poly-$\alpha$-olefin polymers varies over wide limits, the stabilizer compounds of the present invention are not limited to use in any particular molecular weight range of polymer. Poly-$\alpha$-olefin polymers ranging in molecular weight from about 10,000 to about 100,000 and preferably from 10,000 to 20,000 can be stabilized by use of the stabilizer compounds of the present invention. Also, the so-called poly-$\alpha$-olefin waxes having a molecular weight in the range of about 2,000 to about 10,000 are likewise susceptible to stabilization by means of the compounds of the invention. The polymers within the molecular weight ranges given above vary in physical properties such as softness and hardness depending on the densities and crystallinities of the polymers induced by branching of the polymer chain in combination with the molecular weight. Thus, linear high density materials, such as linear polyethylene, tends to be harder than a branched or low density material, such as low density polyethylene, of the same molecular weight. The stabilizer materials of the present invention work with equal effectiveness in both materials. The accommodation of varying physical properties of the hydrocarbon polymer requires only an adjustment in the method of incorporation of the stabilizer therein. As with the polymers, the so-called waxes also vary from soft to brittle depending on crystallinity and the incorporation of the stabilizers therein is accommodated by adjustment of the incorporation method.

The poly-$\alpha$-olefin compositions stabilized in accordance with the invention exhibit an extended life expectancy and are much more useful and practical than unstabilized poly-$\alpha$-olefins and moreover possess a wide diversity of uses including out-of-door installations under prolonged exposure to sunlight and the elements. The poly-$\alpha$-olefins stabilized as contemplated herein can be cast, extruded, rolled or molded into sheets, rods, tubes, piping, filaments and other shaped articles, including sheets or films ranging from 0.5 to 100 mils in thickness. The polymer compositions of the invention can be applied as coatings to paper, cloth, wire, metal foil and are suitable for the manufacture of synthetic fibers and fabrics.

The benzothioxole compound is incorporated in the hydrocarbon polymer in sufficient quantity to have a stabilizing effect on the polymer, e.g., a stabilizing quantity. Although the quantity of stabilizer is not particularly critical, it is recommended that the concentration based on the weight of the polymer be maintained in the range of 0.01% to about 5.0% by weight.

In practicing the invention the thioxole stabilizer compounds can be blended or incorporated into the poly-$\alpha$-olefin compositions by any of the conventional methods commonly used for mixing such materials with thermoplastic polymers. The incorporation technique should be such that a substantially homogeneous blend or intimate admixture of the stabilizer compound in the polymer is obtained so that the stabilizing effect is afforded all portions of the polymer composition. The method of incorporation of the stabilizer in the polymer can vary slightly depending on the physical nature of the hydrocarbon polymer and such variations are easily accomplished by well known techniques. A typical procedure comprises melt blending by milling on heated rolls, although deposition from solvents and dry blending are other well known techniques.

The stabilizers may also be added to liquid polymer compositions in the same fashion by using kneading or milling techniques as is well known. A slurry of the stabilizer in a small quantity of diluted polymer can be made to facilitate its addition to the liquid polymer compositions.

Other additives may be included in the polymer composition such as pigments, dyes, fillers, curing accelerators, or curing agents and the like as is well known in the polymer field. The stabilizing effect is not diminished by the addition of these materials.

These stabilizers have particular utility in the preparation of clear plastic or polymer articles whose clarity is not effected by the presence of the stabilizer in the composition.

The invention is illustrated in the examples which follow. In these examples and throughout this specification, all parts and percentages are by weight based on the weight of the polymer used unless otherwise specified.

*Example 1*

A dry blend consisting of 0.5% of the stabilizer 4-hydroxy-2-keto benzothioxole and 50 grams of isotactic polypropylene was subjected to compression molding in the usual manner at a temperature of 400° F. for six minutes at 2000 p.s.i. to form a 25 millimeter sheet which was thereafter cut into square samples measuring 2 inches. The sample was then exposed in a Xenon Arc Weatherometer operating at 6000 watts. The temperature within the Weatherometer was 140° C. The water cycle was adjusted whereby the sample was subjected to 18 minutes of water spray for each two hours of dry exposure. Exposure damage to the sample of polypropylene was assessed with respect to change of structural strength. The results of the test established that the 4-hydroxy-2-keto benzothioxole protected the polypropylene for 1,609 hours before embrittlement had set in.

The exposure is reported as the number of hours in the Weatherometer which produces structural failure of the sample which for the purposes of these tests refers to the degree of brittleness which causes the samples to break when flexed through 180°. The flex test is conducted every two days on the sample up to three weeks and then twice a week up to ten weeks. The number of hours reported indicates the time a sample is subjected to the Xenon Arc prior to breakage induced by the flex test.

The Weatherometer as used in compiling the data and tests described herein was purchased from the Atlas Electric Devices Company, Chicago, Illinois. The instrument is identified as a 6000 watt Xenon Arc Weatherometer Model 60 W.

The procedure given in Example 1 was repeated utilizing various stabilizer compounds within the scope of the present invention. The compounds, used in the same quantities as in Example 1, are noted in the table below along with the Weatherometer test results:

| Example | Compound Formula | Weatherometer Results (hrs.) |
|---|---|---|
| 2 | 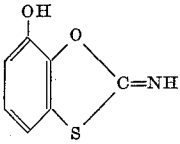<br>7-hydroxy-2-imino benzothioxole | 1,462 |
| 3 | 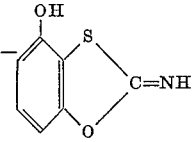<br>4-hydroxy-2-imino-5-chloro benzothioxole | 1,267 |
| 4 | 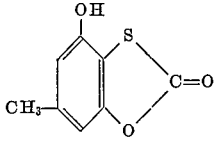<br>2-keto-4-hydroxy-6-methyl benzothioxole | 1,074 |
| 5 | 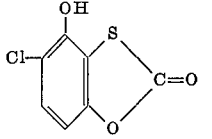<br>4-hydroxy-2-keto-5-chloro benzothiozole | 1,021 |
| 6 | 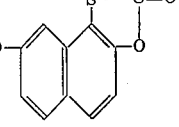<br>8-hydroxy-naphtho [1,2][1,3] thioxole | 1,092 |

The pure polypropylene resin degrades in the Weatherometer within 40 hours and within 400 hours in the presence of an antioxidant material such as 4,4'-dithio-bis-[2,6-bis(α-methyl benzyl)phenol] and the like. Degradation time of the polypropylene in the presence of known stabilizer materials, such as 2 hydroxy-4 octyl benzophenone and the like, range from 1000–1500 hours in the Weatherometer.

The polypropylene resin as used in the above described eramples is an unstabilized general purpose, high molecular weight polypropylene of the isotactic or crystalline type. Typically, it has a melt index of 4 at 230° C. and a specific gravity of 0.905. The resin was purchased from the Hercules Powder Company under the tradename PROFAX and further identified as number 6501, type P-02004 and is supplied in the form of natural flakes.

Thus, and in accordance with the present invention, poly-α-olefinic polymeric materials are stabilized against degradation due to oxidation influenced by ultraviolet light by the inclusion in the polymer composition of a small quantity of a benzothioxole stabilizing material.

The invention is defined in the claims which follow.

What is claimed is:

1. A polymer composition which is stabilized against oxidation and ultraviolet light degradation comprising, in admixture, a hydrocarbon polymer consisting of hydrogen and carbon formed from α-olefins having from 2 to 10 carbon atoms; and as a stabilizer therefor, a stabilizing quantity of a compound of the formula:

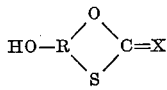

wherein R is an aromatic nucleus attached to the heterocyclic ring in the 1, 2 position and X is selected from the group consisting of (NH) and (O).

2. A polymer composition as recited in claim 1 in which such hydrocarbon polymer is polyethylene.

3. A polymer composition as recited in claim 1 in which such hydrocarbon polymer is polypropylene.

4. A polymer composition as recited in claim 1 wherein from 0.01% to 5.0% by weight based on the weight of the polymer of said stabilizer compound is used.

5. A polymer composition as defined in claim 1 wherein said aromatic nucleus is benzene.

6. A polymer composition as defined in claim 1 wherein the HO group is ortho to said heterocyclic ring.

7. A polymer composition as defined in claim 1 wherein X is (O).

8. A polymer composition as defined in claim 1 wherein X is (NH).

9. A polymer composition as recited in claim 1 wherein said stabilizer compound is 4-hydroxy-2-keto benzothioxole.

10. A polymer composition as recited in claim 1 wherein said stabilizer compound is 4-hydroxy-2-imino benzothioxole.

References Cited

UNITED STATES PATENTS

| 3,049,509 | 81962 | Hardy et al. | 260—45.8 |
| 3,133,072 | 5/1964 | Shibe et al. | 260—45.8 X |

DONALD E. CZAJA, *Primary Examiner.*

M. J. WELSH, *Assistant Examiner.*